United States Patent [19]
Takeyama et al.

[11] 3,873,816
[45] Mar. 25, 1975

[54] AUTOMATIC ADAPTIVE CONTROLLER

[75] Inventors: Hidehiko Takeyama; Tsunenori Honda, both of Tokyo, Japan

[73] Assignee: Agency of Industrial Science & Technology, Tokyo, Japan

[22] Filed: May 18, 1972

[21] Appl. No.: 254,499

Related U.S. Application Data
[63] Continuation-in-part of Ser. No. 886,470, Dec. 19, 1969, abandoned.

[30] Foreign Application Priority Data
Dec. 27, 1968 Japan.................................. 43-95983

[52] U.S. Cl............................ 235/151.11, 235/150.1
[51] Int. Cl....................... G05b 13/02, G06f 15/46
[58] Field of Search..................... 235/150.1, 151.11

[56] References Cited
UNITED STATES PATENTS

| | | |
|---|---|---|
| 3,446,224 | 5/1969 | Zwicky, Jr. ............................ 137/26 |
| 3,490,689 | 1/1970 | Hart et al.......................... 235/151.1 |
| 3,548,172 | 12/1970 | Centner et al. ................. 235/151.11 |
| 3,634,664 | 1/1972 | Valek.............................. 235/150.1 |
| 3,720,120 | 3/1972 | Cutler........................ 235/151.11 X |

*Primary Examiner*—Eugene G. Botz
*Attorney, Agent, or Firm*—Ernest G. Montague; Karl F. Ross; Herbert Dubno

[57] ABSTRACT

An automatic adaptive controller having a data file previously supplied with various control parameters for a process to be controlled, and detectors for observing the process and disturbances introduced in the process. The data file provides to the process basic operation values, at the beginning of the process. The detectors monitor bits of information which cannot be previously provided from the data file, to automatically detect the characteristics of the process and disturbances so that the process can be controlled under the optimum conditions.

2 Claims, 8 Drawing Figures

Data file

Fig. 3
Detector 2
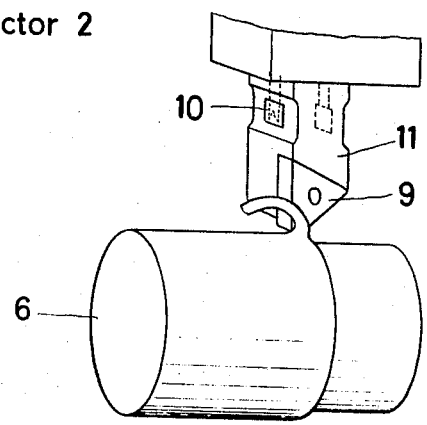
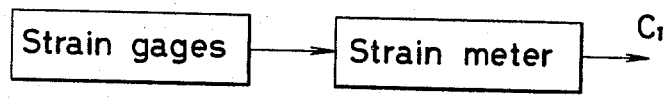
Fig. 5
Detector 2"
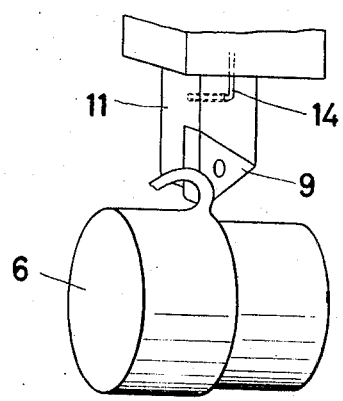
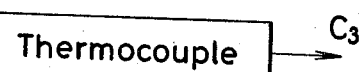
Fig. 4
Detector 2'
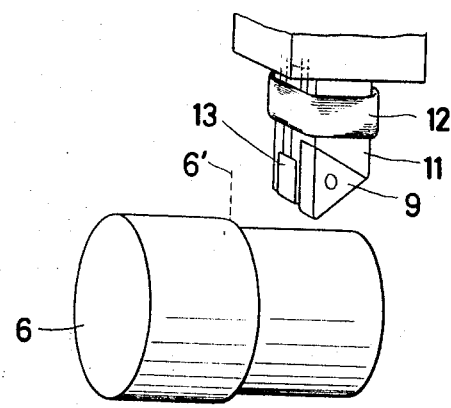
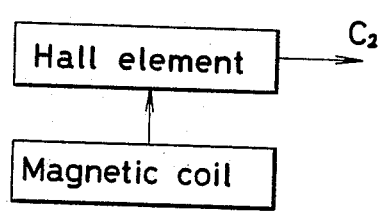

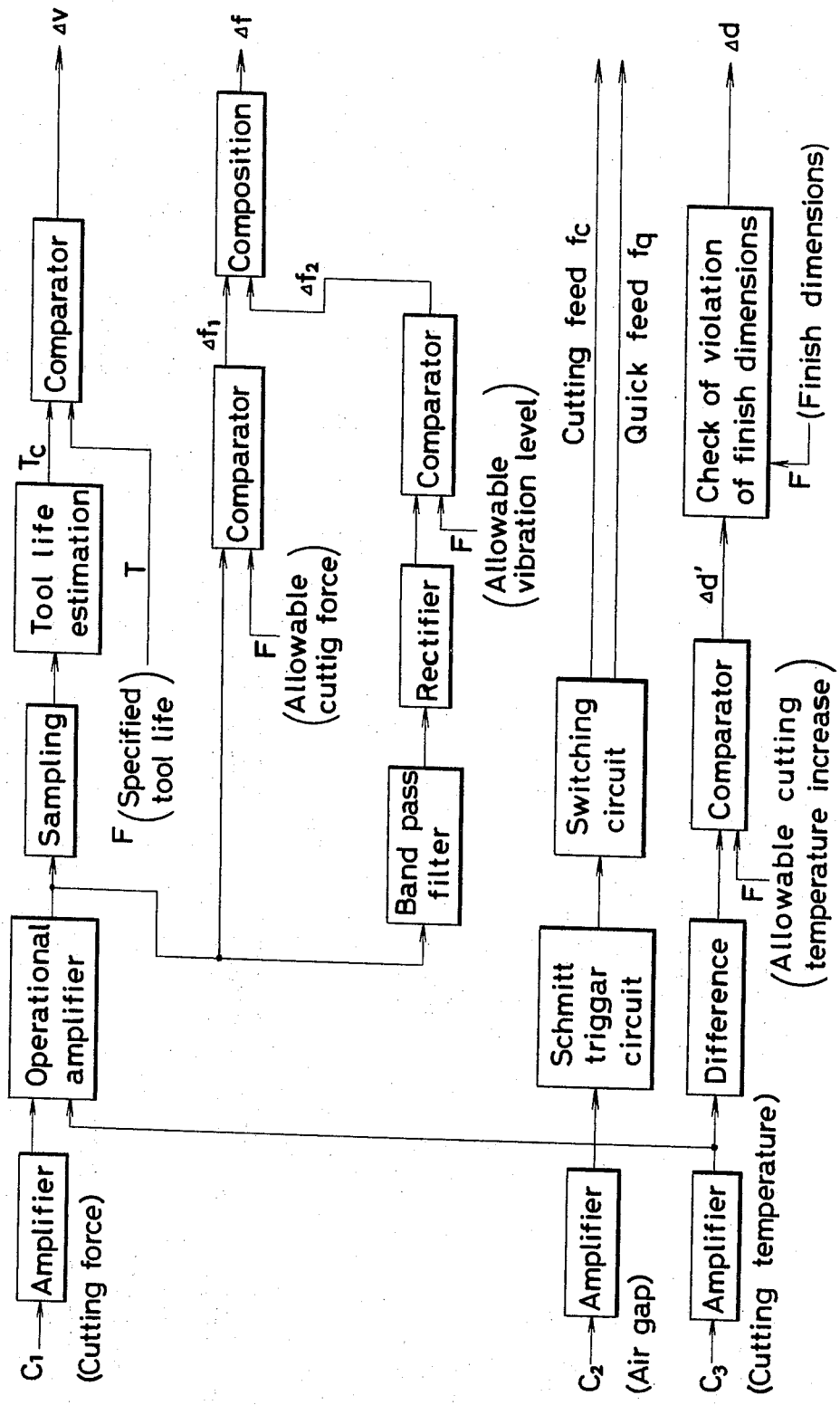
Fig. 6 Computing device

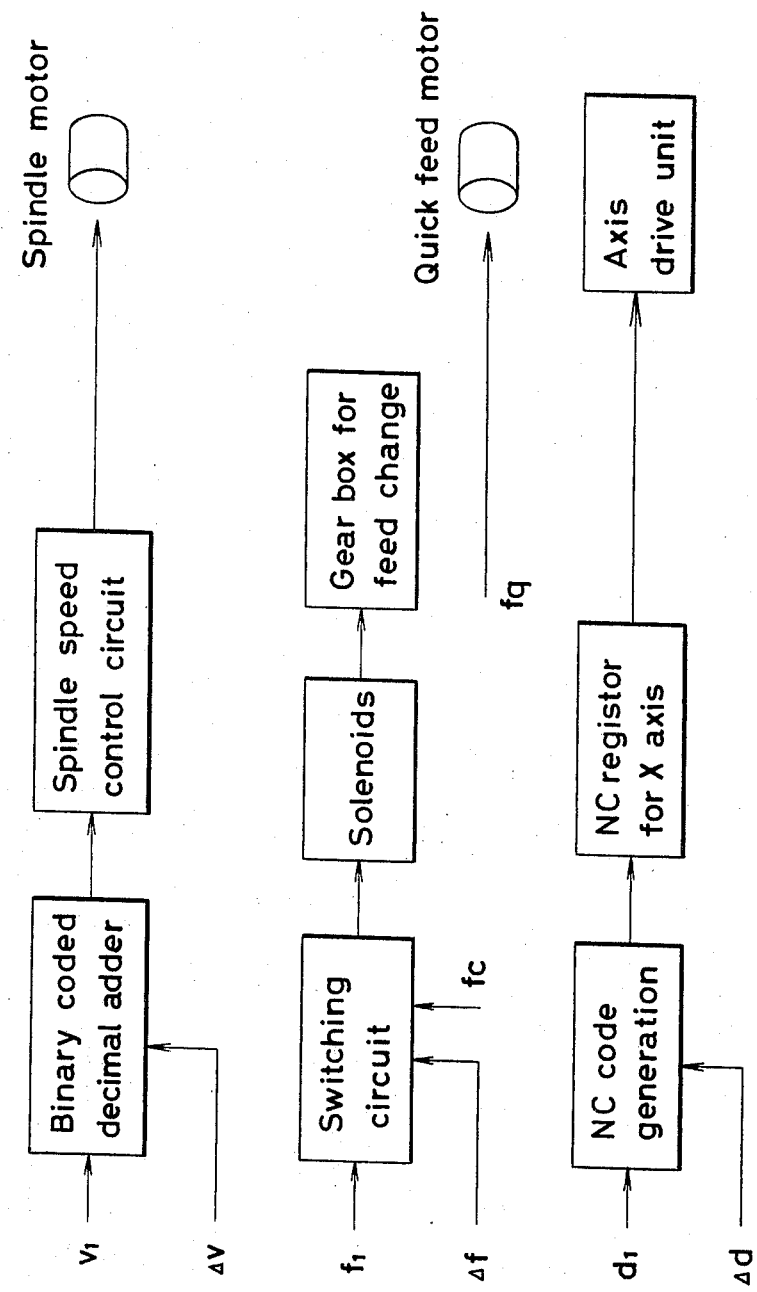

AUTOMATIC ADAPTIVE CONTROLLER

REFERENCE TO RELATED APPLICATION

This is a continuation-in-part of our copending application Ser. No. 886,470, filed Dec. 19, 1969 now abandoned.

The present invention relates to an automatic adaptive controller for use with machine tools or the like.

In order to automatically control a physical activity, such as a cutting process, it is necessary to monitor the process continuously and then correct the actuating signals and/or control parameters in accordance with the predetermined method of the process. However, in the case where the characteristics of the process are varied or some unpredictable disturbance is introduced into this process, the nature of such phenomena must be monitored and the operation of the machine must be corrected accordingly. To accomplish such control there is required an arithmetical operation apparatus which is provided with detectors for detecting the parameters representative of the characteristics of the process and/or responses of the same. This apparatus must be provided in such a manner that the signals obtained from the detectors can be processed at a speed matched to the speed of the machine operation so that the various changes in the characteristics can be recognized and the kinds of signals required as control parameters can be determined.

When the characteristics of the process and the disturbances introduced are relatively simple, the correction can be performed by the above described control system alone. However, if the configuration of the control object is very complex (for example, if it has several or more parameters) or the range of variation of any of the parameters is relatively large even though the number thereof is small, it is very difficult to determine even the initial parameters with which the control should be operated. In this case, it is more effective to prepare in advance data which although general and vague, are extensive in nature and obtain the basic control parameters, including the time of operation commencement, by referring to the data when necessary.

For Example, an adaptive control system in which the cutting speed of the tool and the feed rate of the workpiece undergo compensation with reference to continuously measured variations of the cutting force and temperature is known and described in U.S. Pat. No. 3,548,172. This system, however, is highly complicated, since it is directed to obtaining a figure of merit which gives the most economical cutting and therefore is designed to regulate the cutting speed and the feed rate in accordance with the data, namely the measured variations, so as to always ensure the longest possible service life of the tool. Further, in this system, the starting values for the cutting operation are not automatically corrected by these data.

It is the main object of the present invention to provide an automatic adaptive controller which permits a given work process to be carried out under the optimum conditions by automatically adjusting various control parameters even when the characteristics of the control object and the disturbances vary to some extent.

In the system according to this invention, data known in advance such as data on tool life, cutting speed, and feed rates are stored. The machining is started in accordance with command values which stem from the stored data. The compensation is effected only with respect to the difference between these command values and the objective values of the actual machining process. If the initially stored data prove to be inappropriate after a certain amount of machining, they are automatically corrected and updated so as to permit the objective values of machining to be achieved at all times. Accordingly, the automatic adaptive controller by the present invention can be applied to cutting machines, grinding machines, welding units, etc.

These and other objects and advantages of the present invention will become apparent from the following detailed description with reference to the accompanying drawing, in which:

FIG. 3 through FIG. 5 are perspective views illustrating conditions in which a detector is mounted on a cutting tool in accordance with the present invention;

FIG. 6 is an explanatory diagram illustrating one example of the computing device according to this invention;

FIG. 7 is an explanatory diagram showing one example of the modifier for use in the present invention.

Figure 1:
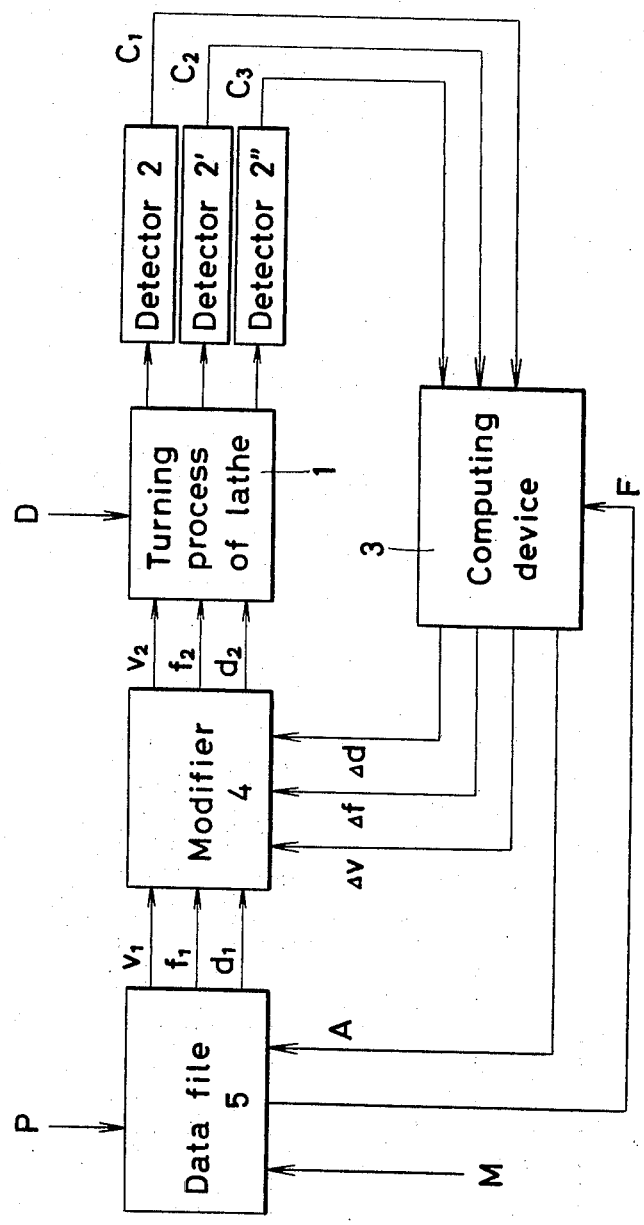
FIG. 1 is a block diagram illustrating one embodiment of the present invention, where the automatic adaptive controller of the present invention is applied to a turning operation, namely to a machining operation by a lathe.

FIG. 1 represents a block diagram which illustrates the automatic adaptive control by the present invention as it is applied to the turning operation. The parameters $p$ indicative of the characteristics of the control objects involved in the turning operation include the material of the work piece to be operated upon and the finished dimensions, the overhang of the tool, the maximum horsepower of the main spindle motor of turning machine to be employed, the maximum torque of the same motor, the tolerance of the product of turning; specified tool life, and the coolant used.

Figure 2:
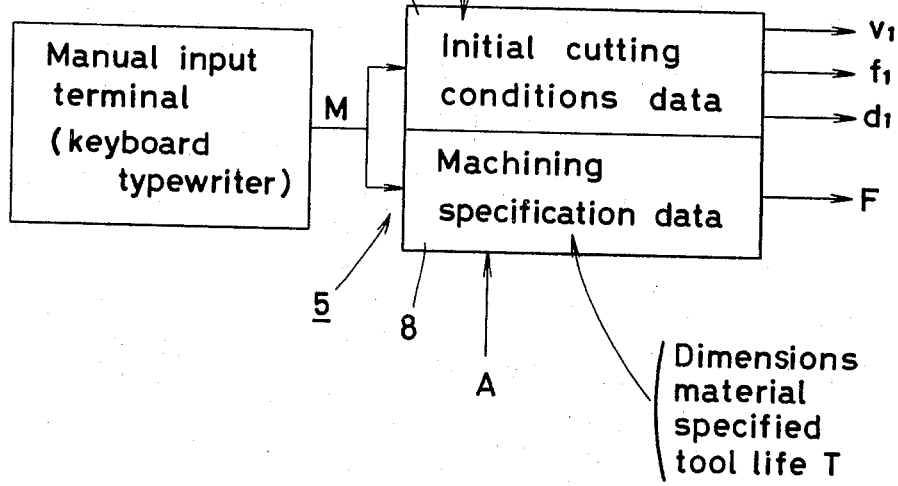
FIG. 2 is an explanatory diagram indicating one example of the data file according to the aforesaid controller of this invention.

The data relating to these parameters are initially stored in the data file 5 by means of a terminal device such as a keyboard typewriter (see FIG. 2). As the data file for the purpose of the present invention, there can be employed a computer comprising a core memory, a logical operation unit, a register, etc. This data file roughly comprises the part 7 which gives the initial cutting conditions such as the feed rate of tool, the depth of cut and the cutting speed and the part 8 which stores the dimensions and material of the workpiece to be operated upon and the specified tool life.

At part 7 of data file 5, the feed rate $f_1$ and the depth of cut $d_1$ for various workpiece materials (such as cast iron, steel, etc.) are stored respectively in the form of numerical values. The cutting speed $v_1$ is computed from the values of the coefficients C and $n$ in Talor's tool life equation, $v = C/T^n$, and stored in part 7. (In the equation, $T$ stands for the value of tool life which is stored in part 8.)

The optimum cutting speed $v_1$, feed rate $f_1$ and depth of cut $d_1$ which can be known prior to the start of machining operation are drawn from data file 5 and are forwarded via the modifier 4 to the turning process 1, where they are used as basic operation values in the cutting operation for a prescribed length of time.

The disturbances D which occur in the turning process 1 while the cutting operation is in progress on the workpiece include, for example, those ascribable to the irregularity of the air gap distribution and the variation of temperature at the cutting edge of the tool.

As a detector 2 for the detection of such disturbances, strain gages 10 are fastened on opposite sides of the shank 11 of the cutting tool 9. With the aid of the strain meter, the detector 2 detects the cutting operating force $C_1$ being exerted during the cutting operation (see FIG. 3). Where the portion of the workpiece 6 to be cut occurs on the lefthand side as illustrated in FIG. 4 and the tool 9 is moved by quick feed over the depressed portion on the righthand side, a magnetic coil 12 is wound round the tool shank 11 to serve as a detector 2'. When the coil 12 is excited, the magnetic flux generated varies in magnitude as the detector 2' approaches the portion 6' at which the workpiece 6 is to be cut. The phenomenon of this change in the magnetic flux is detected as signal $C_2$ by means of a Hall element 13 (FIG. 4). It should be noted that the detector 2' is effective only when the workpiece to be cut is of an iron type material. The heat caused by the cutting motion is conveyed to the tool shank 11. Consequently, the tool shank expands so much as to cause a deviation in the cut dimensions. A thermocouple 14 is embedded as a detector 2'' within the tool shank 11. It detects the temperature of tool shank 11 as signal $C_3$ (FIG. 5). These detectors may be mounted all together on the tool shank 11.

The parameters indicative of the characteristics of the control object and the parameters such as the tool's cutting force $C_1$, air gap $C_2$ and tool temperature distribution $C_3$ which have some bearing upon the characteristics of the disturbances occuring in the course of the cutting operation and which are detectable from the standpoint of mechanical engineering are detected by the respective detectors in the manner mentioned above and then conveyed to the computing unit.

Referring to FIG. 6, the signal $C_1$ received from the detector 2 is amplified in the computing device 3, combined with the signal $C_3$ coming from the detector 2'' and corrected for temperature drift with the operational amplifier. After that, the revised signal is sent to the three devices, i.e., a sampling process, a comparator and a band pass filter.

The revised signal is received by the sampling process. By using this signal, 40 workpieces are cut in this process by way of sampling, with the sampling cycle fixed at an interval of 3 seconds, for example. The data obtained by this sampling are subjected to linear regression by the computer to find the estimated value $T_c$ of tool life. The value $T_c$ thus determined is compared by the comparator with the tool life T delivered from the data file to find their difference. The signal $\Delta v$ for the correction of this deviation is forwarded to the modifier 4.

The revised signal, sent directly to the comparator, is used for the purpose of monitoring whether or not the relevant cutting force exerted exceeds the allowable value. If the exerted cutting force has an excessive value, the signal $\Delta f_1$ of a negative value will be produced.

The revised signal supplied to the band pass filter is used for detecting vibration at comparatively high frequencies (exceeding 1 KHz). After being rectified by the rectifier into a direct current signal, they are compared by the comparator with the allowable value of vibration. If the vibration detected has an excessive value, a signal $\Delta f_2$ is generated for decreasing the value. When the two comparators put forth the signals $\Delta f_1$ and $\Delta f_2$ respectively, the two signals are adjusted by the composition unit so as to adopt whichever has a smaller $f$ value preferentially, giving rise to a signal $\Delta f$.

A signal $C_2$ coming from the detector 2' and denoting the airgap is amplified, and is sent to the Schmitt trigger which generates an on-signal when the signal is over a specified level of voltage and an off-signal when it is below such level. According to this output, an adequate feed mode is selected between the cutting feed $f_c$ and the quick feed $f_q$.

A signal $C_3$ denoting cutting temperature from the detector 2'' is amplified. The amplification difference corresponding to the rise of temperature is taken. If it exceeds the allowable increase, there is generated a correction signal $\Delta d'$ for decreasing the depth of the cut. However, since the signal $\Delta d'$ must not cause an excessive depth of cut over the specified dimensions given of the finished workpiece, it is compared with the data F pertaining to dimensions of the finished part received from the data file 5, for checking whether or not the depth of cut is excessive and is then sent out.

The signals $\Delta v$, $\Delta f$ and $\Delta d$ obtained as mentioned above are sent to the modifier 4.

The modifier 4 receives data $v_1$, $f_1$ and $d_1$ from the data file 5, modifies them, in accordance with the correction signals $\Delta v$, $\Delta f$ and $\Delta d$ from the computing device 3, into corrected signals $v_2$, $f_2$ and $d_2$ respectively and forwards them to the turning process 1. Referring to FIG. 7, the signal $v_1$ from the data file 5 and the signal $\Delta v$ from the computing device 3 are subjected, in the form of binary coded decimal numerals, to addition or subtraction. The output signal $v_2$ of this calculation is given to the spindle speed control circuit. It is used for controlling the rotation speed of the spindle motor thereby adjusting the cutting speed.

The values $f_1$ and $\Delta f$ are combined to form a 4-bit code when the signal $F_c$ showing the forwarding of the cutting feed is on. They select a feed corresponding to the code by switching the four solenoids. When the signal $f_c$ is off, the signal $f_q$ is on. In this condition, the tool is moved in quick feed by rotating the quick feed motor.

In the NC code generator, the signals $d_1$ and $\Delta d$ are combined to produce a new code, representing the depth of the cut, for the numerical control circuit. This code is sent to the NC register for adjusting the axis drive unit and controlling the depth of the cut on the workpiece.

Thus, the basic operation values initially supplied from the data file 5 are corrected in accordance with the depth of cut determinable by the actual operation of cutting, so that the machining operation will be carried out under conditions permitting shavings to be cut off, precluding occurrence of distortion and improving the cutting efficiency while satisfying restrictive requirements such as on the horsepower of the main spindle motor in the turning machine to be employed, the maximum torque of the same motor, the tolerance of the product of turning, the finished dimensions, etc.

Where deviations in parameters and disturbances are so large that the computing device 3 alone cannot give required correction to control parameters concerning the cutting operation, the signal A derived the values obtained from the computing device 3 is sent to the data file 5 for updating the values of relevant data stored in the data file. Then, the data file 5 issues control information conforming to the new updated parameters and sends it to the turning process.

Figure 8:
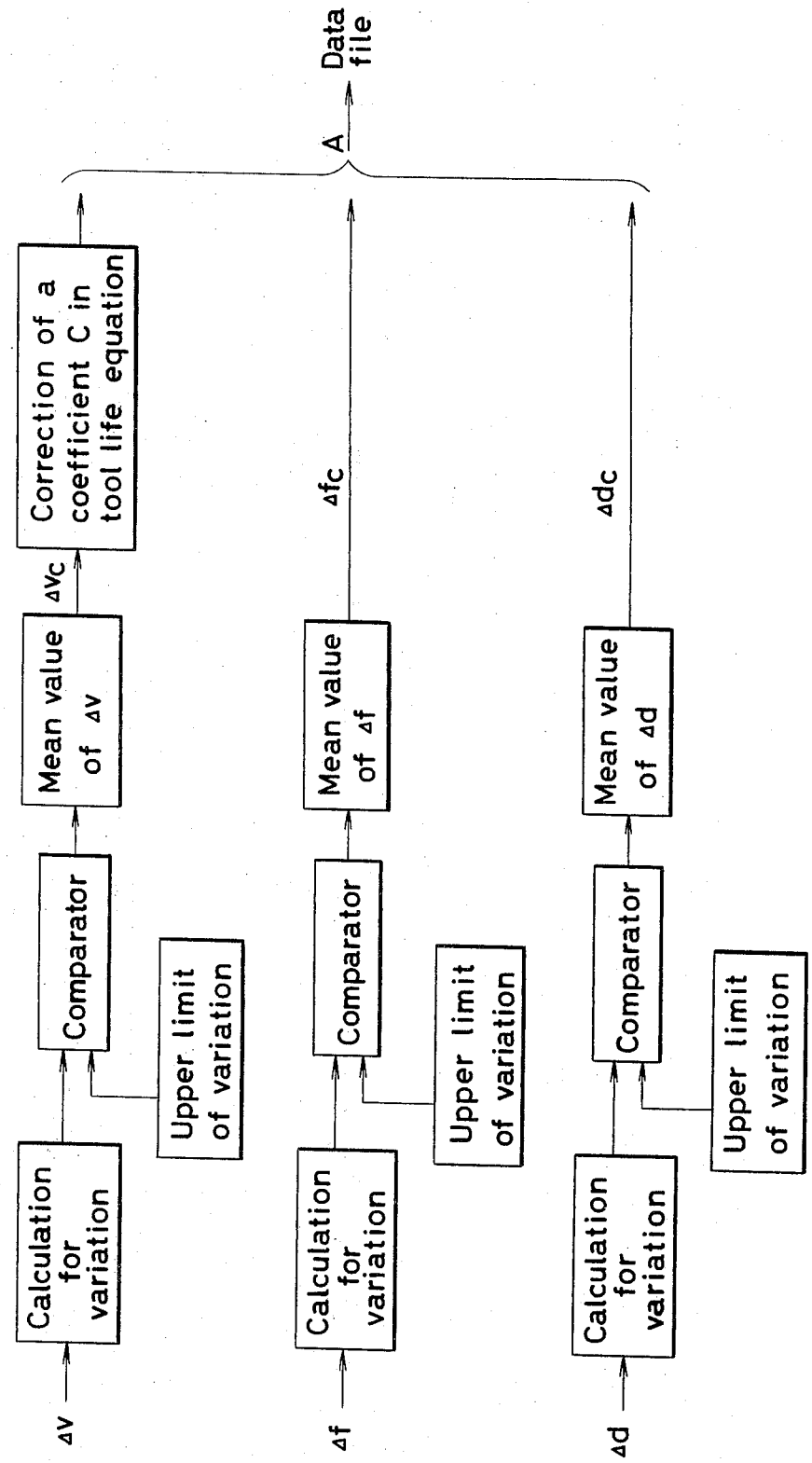
FIG. 8 is an explanatory diagram of the computing device wherein the values of the data file are corrected by the objective values of machining.

FIG. 8 is an explanatory diagram of one preferred embodiment in which the numerical values stores in the data file 5 are corrected by the values obtained by the computing device 3. Computation is made to determine how much the correction values $\Delta v$, $\Delta f$ and $\Delta d$ differ from their corresponding basic operation values. Then, the values of deviation are analyzed by the comparator to determine whether or not they exceed the upper limits of their allowable ranges. If they are found to exceed the upper limits, their respective mean values $\Delta v_c$, $\Delta f_c$ and $\Delta d_c$ are forwarded as signal A to the data file 5 to update the data stored in the data file. In this case, the values $f_1$ and $d_1$ are stored directly in the form of numerical values within the data file and, therefore, have only to be corrected to values $f_c$ and $d_c$ respectively. By contrast, value $v_1$ is a piece of data representing one coefficient $C$ ($= v_c T^n$) in the tool life equation as already dealt with in connection with the description of the data file. Therefore, the value $v_c$ for correction is delivered to the data file after it has undergone proper computation for conversion.

The said procedure of correction may be accomplished manually in accordance with the discretion of the machine attendant.

According to the present invention, basic operation values are derived from all the information initially available concerning the control object and are forwarded to the process, starting the intended operation. In the course of operation, changes in the conditions of the control object and characteristics of disturbances are detected. Based on the signals representing such detected deviations, the initial operation values are corrected, permitting the operation to be continued without being affected by such undesirable factors. Thus, the present invention enables the operation to be performed stably by automatically adjusting various control parameters even when the characteristics of the control object and the disturbances vary to a fairly large extent. The method of this invention, therefore, can be operated under the optimum conditions in a system such that the characteristics of the control object and the disturbances are diverse and greatly variable.

The present invention has so far been described with respect to one particular case where the automatic adaptive controller is applied to a turning process. It should be noted, however, that the invention can also be applied to various operations which require accurate process control. Needless to mention, the method of this invention can be applied to other mechanical operations such as grinding and welding.

We claim:

1. An automatic adaptive controller for managing tool life by controlling a cutting tool, comprising
   cutting tool means,
   data file means for storing a plurality of data including predetermined tool-feed rate, depth of cut and cutting speed representing a plurality of cutting conditons for a multiplicity of materials and for emitting corresponding data signals and information signals including a signal representing tool life,
   modifier means connected between said data file means and said cutting tool means for receiving said data signals and for sending basic operational values to said cutting tool means for starting said cutting tool means to effect a cutting operation initially controlled solely by said data signals and subsequently by said data signals as modified by correction signals,
   a plurality of detector means for detecting characteristics of said cutting operation of said cutting tool means, including operating force to detect tool wear, and providing respective detection signals, and
   computing means for receiving said detection signals and for receiving said information signals from said data file means and for providing said correction signals to said modifier means, said modifier means for modifying said optimum data signals by said correction signals and for providing and sending corrected signals to said cutting tool means for controlling the cutting operation of said cutting tool means, said computing means including sampling means for collecting data relating to tool life over a plurality of cutting operations and producing a further correction signal representing same, and means for applying signals derived from said computing means to data file means for altering the data stored therein.

2. An automatic adaptive controller for managing tool life by controlling a cutting tool, comprising
   a cutting tool means,
   a data file means for storing a plurality of data representing a plurality of cutting conditions and for emitting corresponding optimum data signals and information signals,
   a modifier means connected to said cutting tool means for receiving said optimum data signals and for sending basic operational values to said cutting tool means for starting said cutting tool means to effect a cutting operation,
   a plurality of detector means for detecting characteristics of said cutting operation of said cutting tool means, including operating force to detect tool wear, and providing detection signals,
   a computing means for receiving said detection signals and for receiving said information signals from said data file means and for providing correction signals to said modifier means, and
   said modifier means for modifying said optimum data signals by said correction signals and for providing and sending corrected signals to said cutting tool means for controlling the cutting operation of said cutting tool means,
   said detector means including a cutting force detector and a cutting temperature detector,
   said computing means comprising,
   a first amplifier connected to said cutting force detector,
   a second amplifier connected to said cutting temperature detector,
   a sampling means,
   a band pass filter,
   an operational amplifier connected to receive output signals from both said first and second amplifiers and having an output connected to said sampling means and said band pass filter, a tool life estimation means connected to said sampling means,
a first comparator means for receiving and comparing output signals from said tool life estimation means and said information signals from said data file means and providing one of said correction signals,
a rectifier connected to said band pass filter,
a second comparator means for receiving and comparing output signals from said rectifier and said information signals from said data file means,
a third comparator means connected to said output of said operational amplifier and for comparison with said information signals from said data file means, a composition means connected to said second and third comparator means for providing another of said correction signals,
a difference means connected to said second amplifier for providing an amplification difference corresponding to a rise of cutting temperature,
a fourth comparator means connected to said difference means and receiving said information signals from said data file means, and
a fifth comparator means for connection to said fourth comparator means and receiving information signals from said data file means and providing an additional one of said correction signals.

* * * * *